No. 830,982. PATENTED SEPT. 11, 1906.
J. B. ENTZ.
SYSTEM OF ELECTRICAL DISTRIBUTION.
APPLICATION FILED MAR. 28, 1905.
2 SHEETS—SHEET 1.
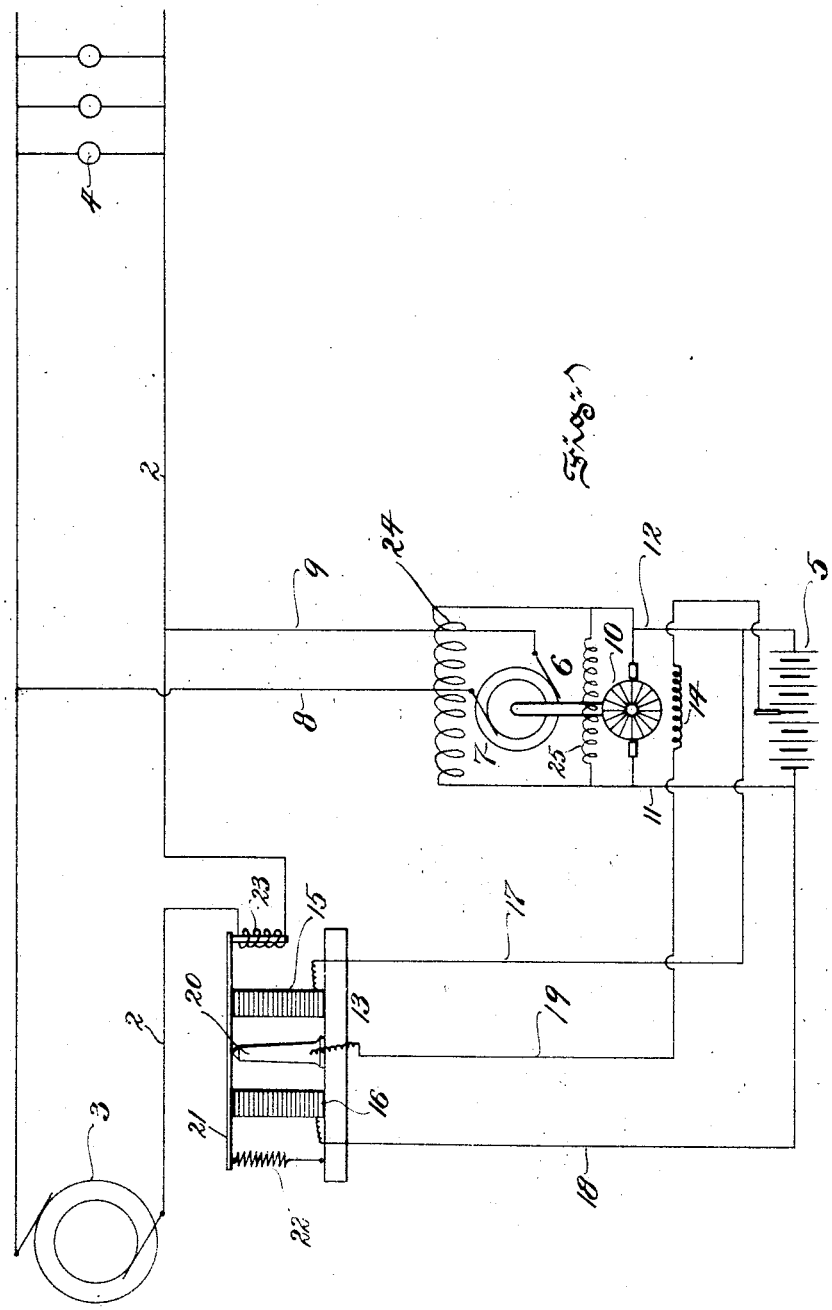

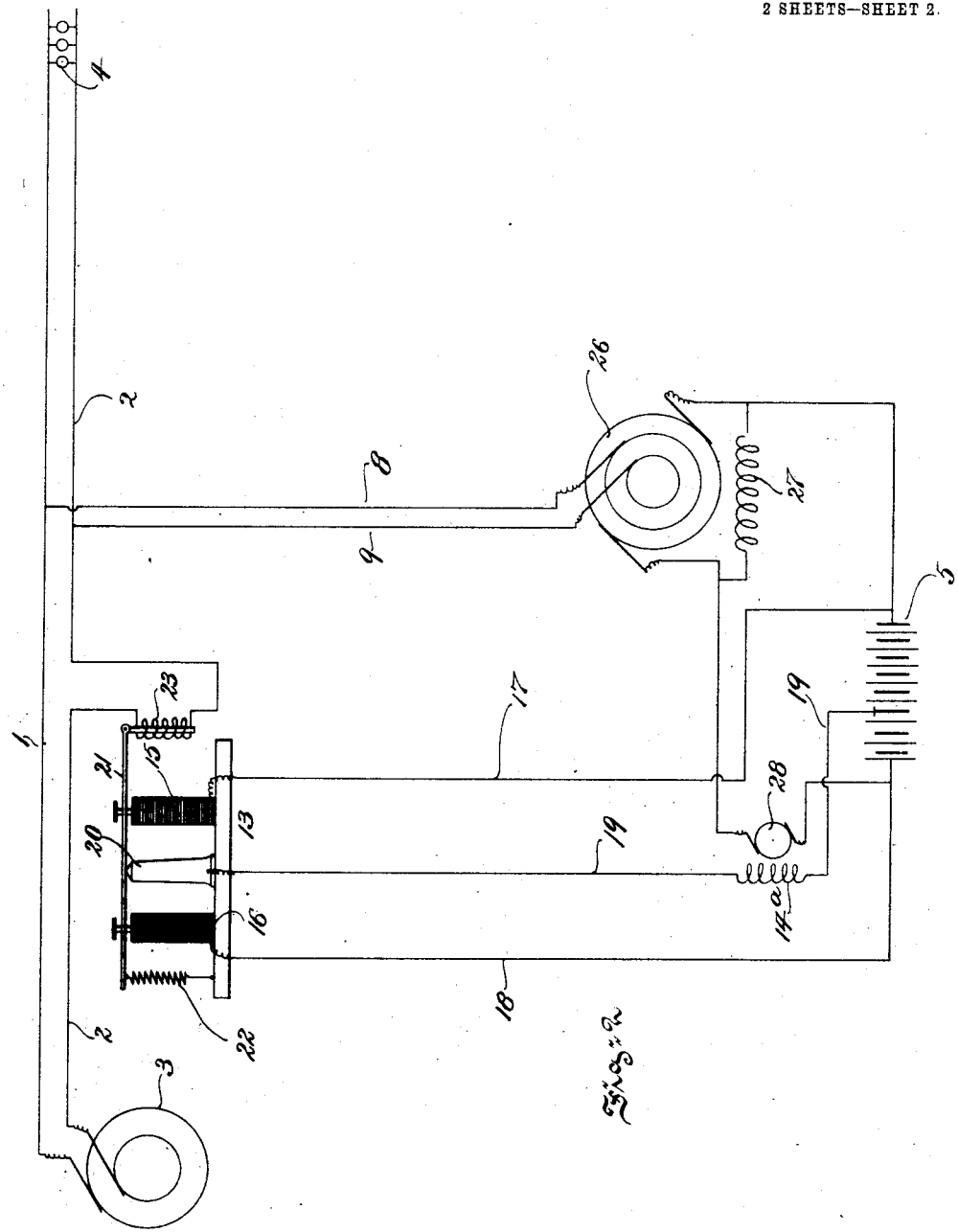

UNITED STATES PATENT OFFICE.

JUSTUS B. ENTZ, OF PHILADELPHIA, PENNSYLVANIA.

SYSTEM OF ELECTRICAL DISTRIBUTION.

No. 830,982.     Specification of Letters Patent.     Patented Sept. 11, 1906.

Application filed March 28, 1905. Serial No. 252,475.

*To all whom it may concern:*

Be it known that I, JUSTUS B. ENTZ, a citizen of the United States, residing at the city of Philadelphia, in the county of Philadelphia and State of Pennsylvania, have invented a certain new and useful System of Electrical Distribution, of which the following is a specification.

One object of the invention is to provide for adding and subtracting electromotive force to and from a direct-current circuit which is correlated to an alternating-current circuit, so as to cause the former to give and take current in respect to the latter.

Another object of the present invention is to provide simple, efficient, and satisfactory means for causing a storage battery to regulate an alternating circuit.

To these and other ends hereinafter set forth the invention comprises the improvements to be presently described and finally claimed.

The nature, characteristic features, and scope of my invention will be more fully understood from the following description, taken in connection with the accompanying drawings, forming part hereof, and in which—

Figure 1 is a diagrammatic view of a system of distribution embodying features of the invention, and Fig. 2 is a similar view illustrating a modifiaction.

In the drawings, 1 2 represent an alternating-current circuit having an alternating-current generator 3 and adapted to supply translating devices, as 4.

5 is a storage battery.

6 represents transforming provisions interposed between the battery and alternating-current circuit 1 2. As shown in Fig. 1, these provisions comprise a motor-generator having its alternating-current end 7 connected across the leads 1 2, as by conductors 8 9, and having its direct-current end 10 connected to the battery-terminals, as by conductors 11 12.

13 is a regulator having field connections 14 and responsive to changes in the alternating-current circuit. It is adapted to effect changes in the direct-current voltage to permit the battery to deliver and receive current from the alternating-current circuit. The regulator shown is of the type described and claimed in my Letters Patent numbered 763,168.

15 and 16 are piles or groups of carbon or other material whose electrical conductivity varies with pressure, and they are shown as respectively connected by conductors 17 and 18 across the battery. The conductor 19 is connected to the center of the battery and to the support 20 and by way of the pivoted lever 21 through both groups 15 and 16. The lever 21 is of course otherwise insulated, and it is connected with the spring 22 and with the core of a solenoid 23, interposed in the line 2 of the alternating circuit. The solenoid 23 is responsive to changes in the alternating-current circuit and exerts more or less pressure upon the groups or piles 15 and 16. The effect of this is to cause current to pass in one or the other direction through the field-coil 14 or even not to pass at all, so that the field-coil 14 in response to changes of load on the alternating-current circuit influences the direct-current end 10 to either operate at times of heavy load on the alternating-current circuit as a motor, thus taking energy from the battery and causing the end 7 to deliver alternating current to the line 1 2, or to operate at times of light load on the alternating-current circuit as a generator-drum driven by the end 7 and delivering direct current to the battery 5. Furthermore, the regulator 13 not only controls the direction of excitation of this field 14, as has been described, but also the degree of such excitation in either direction in accordance with the fluctuations of load on the alternating-current circuit, and therefore tends to keep an approximately constant load on the generator 3.

24 and 25 are the field-coils of the alternating-current and direct-current ends of the motor-generator and for convenience are shown as tapped across between the leads 11 and 12.

The construction and mode of operation of the apparatus shown in Fig. 2 are substantially the same as in Fig. 1, except that instead of a motor-generator a rotary converter 26, having field-windings 27, common to both of its ends, is employed, and the coil 14$^a$ is applied as the field of a suitably-driven booster 28, interposed between the direct-current end of the rotary 26 and the battery, thereby causing the battery to charge and discharge in the same manner as has been described in connection with Fig. 1.

It will be seen that the operation of the regulator shown in Figs. 1 and 2 is dependent upon changes of energy in the alternating-current circuit, but is independent of any change in the frequency in said circuit. However, the regulator constitutes a positive cause which compels the battery to charge and discharge, regardless of the characteristics, whether rising, falling, or flat, of the direct and alternating current circuits or of the machines by which they are supplied.

Upon an increase of the load 4 on the circuit 1 2 there is an increase of current in the solenoid 23, which causes it to exert additional pull upon its core and upon the arm 21, which is pivoted upon the point 20. This causes a diminution of the pressure upon the carbon pile 16 and an increase of pressure upon the carbon pile 15. The resistance of the carbon pile 16 is increased, while that of the carbon pile 15 is decreased. The effect is to cause current to flow from the battery by way of the lead 19, through the direct-current field-coil, through the carbon pile 15 and lead 17 back to the battery. The effect of the current in this direction is such as to build up a direct-current electromotive force and cause the battery to discharge into the alternating direct current transformer, which in its turn gives current to the alternating-current line 1 2. When the load falls off, the relative pressure on the carbons is reversed, causing the current to flow through the direct-current field in the reverse direction, whereby the battery is caused to charge, the transforming provisions receiving power from the circuit 1 2.

It will be obvious to those skilled in the art to which my invention appertains that modifications may be made in details without departing from the spirit thereof. Hence the invention is not limited other than the prior state of the art may require; but,

Having thus described the nature and objects of my invention, what I claim as new, and desire to secure by Letters Patent, is—

1. A system of electrical distribution comprising an alternating-current circuit and its generator, a battery, transforming provisions interposed between the battery and the alternating-current circuit, and a regulator and field connections operatively independent of changes of frequency in the alternating-current circuit and responsive to changes of energy in the alternating-current circuit and adapted to effect changes in the direct-current voltage to permit the battery to deliver and receive energy in respect to the alternating-current circuit, substantially as described.

2. A system of electrical distribution comprising an alternating-current circuit and its generator, a direct-current circuit and its source of direct-current energy, transforming provisions, and a regulator operatively independent of changes of frequency in the alternating-current circuit and responsive to changes of energy in the alternating-current circuit and adapted to effect addition and subtraction of electromotive force to and from the direct-current circuit, substantially as described.

3. A system of electrical distribution comprising an alternating-current circuit and its generator, a battery, transforming provisions interposed between the battery and the alternating-current circuit, and means operatively independent of changes of frequency in the alternating-current circuit and responsive to changes of energy in the alternating-current circuit and adapted to effect changes in the direct-current voltage to permit the battery to deliver and receive energy in respect to the alternating-current circuit, substantially as described.

4. A system of electrical distribution comprising an alternating-current circuit and its generator, a direct-current circuit and its source of direct-current energy, transforming provisions, and means operatively independent of changes of frequency in the alternating-current circuit and responsive to changes of energy in the alternating-current circuit and adapted to effect addition and subtraction of electromotive force to and from the direct-current circuit, substantially as described.

5. A system of electrical distribution comprising an alternating-current circuit and its generator, a direct-current circuit, a battery across the direct-current circuit, and means responsive to changes of energy in the alternating-current circuit and adapted to compel the battery to charge and discharge in response to such changes of energy, substantially as described.

In testimony whereof I have hereunto signed my name in the presence of two witnesses.

JUSTUS B. ENTZ.

Witnesses:
WM. J. JACKSON,
K. B. GILLIGAN.